Jan. 18, 1955  W. SELOVE  2,700,103
BALANCED DETECTOR CIRCUIT
Filed May 15, 1946

INVENTOR
WALTER SELOVE

BY
ATTORNEY

United States Patent Office 2,700,103
Patented Jan. 18, 1955

2,700,103
BALANCED-DETECTOR CIRCUIT

Walter Selove, Chicago, Ill., assignor, by mesne assignments, to the United States of America as represented by the Secretary of the Navy Application May 15, 1946, Serial No. 669,782

5 Claims. (Cl. 250—27)

This invention relates to balanced-detector circuits and more particularly to a detector circuit which upon application of vector voltages $E_1$ and $E_2$ provides an output signal closely proportional to the difference of the quantities $|E_1+E_2|$ and $|E_1-E_2|$.

In certain types of radar installations a "moving target indicator" circuit is incorporated, which in turn includes a balanced-detector. A balanced-detector is a discriminator circuit whose output is proportional to the magnitude of the vector sum of two input voltages minus the magnitude of the vector difference of the same two voltages. Balanced-detectors are in use at the present time but are difficult to construct and balance since such circuits require magnetic coupling, and since stray capacitances in such circuits are difficult to balance.

It is an object of the present invention to provide a balanced-detector circuit which is of simple construction and readily balanced.

Another object of the present invention is to provide a circuit responsive to two input voltages, and whose output is approximately equal to the magnitude of the vector sum minus the magnitude of the vector difference of said two input voltages.

A further object is to provide a balanced-detector circuit wherein stray capacitance is of negligible effect.

A still further object is to provide a balanced-detector circuit which provides wide band response to at least one of two input voltages.

These and other objects will become apparent from the following specification when taken in connection with the accompanying drawing in which.

A balanced-detector circuit is one which delivers an output approximately proportional to $|E_1+E_2|-|E_1-E_2|$ where $E_1$ and $E_2$ are two vector voltages applied to the circuit. More specifically if two voltages, namely, $E_1 = A_1 \cos(\omega t + \theta_1)$, and $E_2 = A_2 \cos(\omega t + \theta_2)$ are applied, the output is approximately proportional to $A_3 - A_4$ where $E_1 + E_2 = A_3 \cos(\omega t + \theta_3)$ and $E_1 - E_2 = A_4 \cos(\omega t + \theta_4)$. In the above expressions $\theta$ represents relative phase, the coefficients $A$ are constant, and $\omega$ equals angular frequency.

Figure 1:
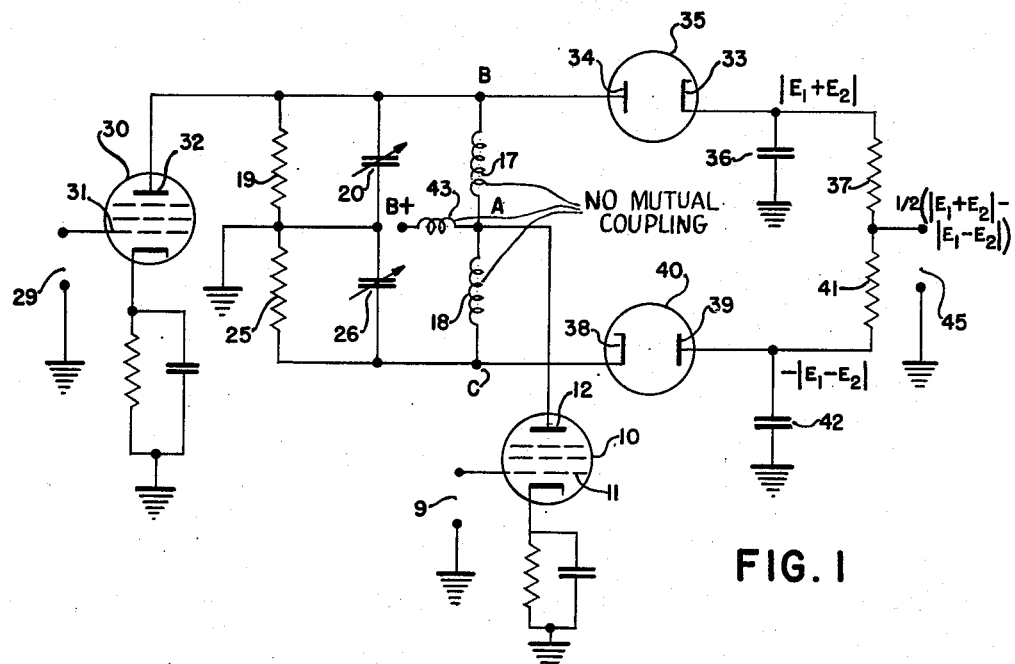
Fig. 1 is a schematic diagram of one form of the invention.

Referring now to Fig. 1, a voltage $K_1 E_1$ is applied through terminals 9 to grid 11 of amplifier tube 10 causing an output voltage equal to $K_1' E_1$ to appear at plate 12 of tube 10. Voltage $K_1' E_1$ is applied to two inductances 17 and 18 at point A, causing a voltage $E_1$ to appear at points B and C. The other side of inductance 17, point B, is connected to ground through the parallel combination of resistor 19 and variable condenser 20, and the other side of inductance 18, point C, is connected to ground through the parallel combination of resistor 25 and variable condenser 26. A voltage $K_2 E_2$ is applied through terminals 29 to grid 31 of tube 30 causing an output voltage equivalent to $E_2$ to appear at plate 32 of tube 30. The voltage $E_2$ is applied to two circuits, one of which is the parallel combination of resistor 19 and condenser 20, and the other is through inductances 17 and 18 in series with the parallel combination of resistor 25 and condenser 26. Resistance 19 is equal in value to resistance 25, condenser 20 is equal in value to condenser 26, and inductance 17 is equal in value to inductance 18.

Thus, $$L_1 C_1 = L_2 C_2 = \frac{1}{\omega_0^2}$$

where:

$L_1$ is the value of inductance 17,
$C_1$ is the value of condenser 20,
$L_2$ is the value of inductance 18,
$C_2$ is the value of condenser 26, and
$\omega_0^2 = (2\pi f)^2$, where $f$ is the operating frequency.

The value of resistance 37 is made equal to that of resistance 41, and the value of condenser 36 is made equal to that of condenser 42. Point B of inductance 17 is connected to plate 34 of diode 35. Cathode 33 of diode 35 is connected to output terminals 45 through resistor 37 and to ground through condenser 36. Point C is connected to cathode 38 of diode 40. Plate 39 of diode 40 is connected to output terminals 45 by means of resistor 41 and to ground by means of condenser 42. Plate 12 of tube 10 and plate 32 of tube 30 are energized from the B+ supply through choke 43.

Figure 2:
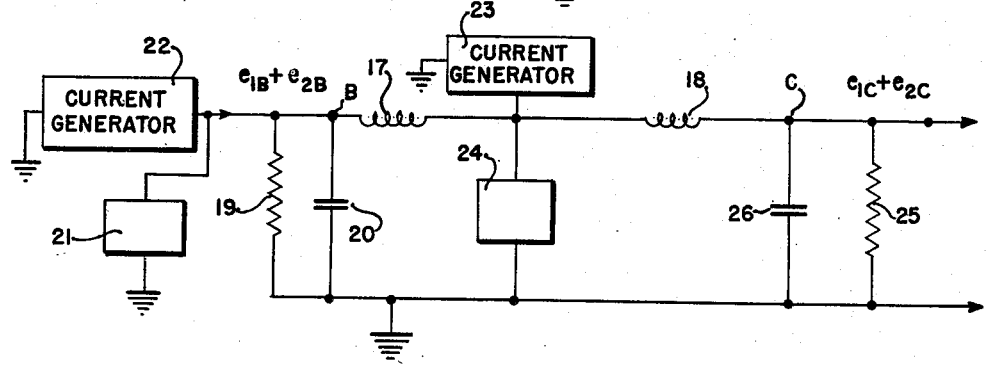
Fig. 2 is the equivalent circuit of a portion of the schematic diagram of Fig. 1.

Referring to Fig. 2, there is shown an equivalent circuit of part of the schematic diagram of Fig. 1. Inductances 17 and 18, resistors 19 and 25, and condensers 20 and 26 are the same as in Fig. 1. Block 24 represents the impedance offered by tube 10, and block 21 represents the impedance of tube 30. Current generator 22 replaces tube 30 and generates a current $i_2$. Current generator 23 replaces tube 10 and generates a current $i_1$.

Since Fig. 2 is the equivalent circuit of Fig. 1, voltages developed at any point of Fig. 2 will be developed at the corresponding points in Fig. 1. This holds true of points B and C. In Fig. 2 the voltage developed at point B by $i_1$ is called $e_{1b}$, and the voltage developed by $i_2$ is called $e_{2b}$. The voltage developed at point C by $i_1$ is called $e_{1c}$ and the voltage developed by $i_2$ is called $e_{2c}$. Thus the total voltage developed at point B is equal to the vector sum of $e_{1b}+e_{2b}$ and the total voltage developed at point C is equal to the vector sum of $e_{1c}+e_{2c}$. Since the value of inductance 17 is equal to that of inductance 18, the value of condenser 20 is equal to that of condenser 26, and the value of resistance 19 is equal to that of resistance 25, and since the impedance of block 21 is high compared to the impedance of the rest of the circuit as seen from block 21, $e_{1b}=e_{1c}$.

Since $$L_1 C_1 = L_2 C_2 = \frac{1}{\omega_0^2}$$

as has been previously stated, and since $$\omega_0 R_1 C_1 = \omega_0 R_2 C_2$$

and if each of the latter terms is much greater than 1; then $e_{2b}$ is approximately equal to $-e_{2c}$ as will be shown below. In the above expression:

$\omega_0$ is the operating angular frequency,
$R_1$ is the value of resistor 19,
$C_1$ is the value of condenser 20,
$R_2$ is the value of resistor 25, and
$C_2$ is the value of condenser 26.

When the impedance of block 24 is large compared to the impedance of the rest of the circuit as seen from block 24, the explicit relation between $e_{2b}$ and $e_{2c}$ is:

$$\frac{e_{2c}}{e_{2b}} = \frac{1}{1 - 2\omega LC + \frac{2J\omega L}{R}}$$

The above expression is derived from the formulas for series resonance. Since $$\omega_0^2 = \frac{1}{LC}$$

and $$Q = \frac{R}{\omega_0 L}$$

then by substitution, $$\frac{e_{2c}}{e_{2b}} = \frac{1}{1-2\frac{\omega^2}{\omega_0^2}+j\frac{2}{Q}}$$

If $\omega$ is chosen equal to $\omega_0$, as is done in the circuit illustrated, the above reduces to $$\frac{e_{2c}}{e_{2b}} = \frac{1}{-1\left(1+2\frac{j}{Q}\right)}$$

and if Q is large enough, for all practical purposes $e_{2c}=-e_{2b}$.

It has been pointed out that the voltage developed at point B is equal to $e_{1b}+e_{2b}$ and the voltage developed at point C is equal to $e_{1c}+e_{2c}$. It has also been shown that $e_{1b}=e_{1c}$, and $e_{2b}=-e_{2c}$. Therefore, the voltage at point B is equal to $e_{1b}+e_{2b}$ and the voltage at point C is equal to $e_{1b}-e_{2b}$. If proper values of $i_1$ and $i_2$ are chosen the voltage at point B becomes $E_1+E_2$ and the voltage at point C becomes $E_1-E_2$.

In operation, there is a voltage $E_1+E_2$ developed at point B (Fig. 1), and a voltage $E_1-E_2$ developed at point C (Fig. 1). The former of these two voltages is applied to the detector circuit comprising rectifier tube 35 and condenser 36 with a resultant output at terminals 45 equal to $\frac{1}{2}|E_1+E_2|$ where $|E_1+E_2|$ is a direct voltage corresponding to the peak alternating voltage input to the circuit. The second of the two voltages is applied to the detector circuit of rectifier tube 40 and condenser 42 with a resultant output at terminals 45 equal to $-\frac{1}{2}|E_1-E_2|$ where $-|E_1-E_2|$ is a direct voltage corresponding to the peak of the alternating voltage input.

All stray capacitance in this circuit is in parallel with condensers 20 and 26 and since condensers 20 and 26 are variable the effect of all stray capacitance can easily be cancelled out.

While a particular embodiment of this invention has been disclosed and described, it is to be understood that various changes and modifications may be made therein without departing from the spirit and scope thereof as set forth in the appended claims.

What is claimed is:
1. A balanced detector comprising, a first source of voltage, a second source of voltage, first and second inductors, first and second capacitors, means for applying voltage from said first source across a parallel combination of said first inductor and said first capacitor in series and said inductor and said second capacitor in series, means for applying voltage from said second source across said first inductor, said second inductor and said second capacitor in series, and means for deriving an output voltage across the junction of said second voltage source and said first inductor and the junction of said second inductor and said second capacitor equal to the vector sum less the vector difference of said voltages from said first and second sources.

2. Apparatus as in claim 1 wherein a first resistor is connected in shunt with said first capacitor and a second resistor is connected in shunt with said second capacitor.

3. Apparatus as in claim 2, wherein the value of said first inductor is equal to that of said second inductor, the value of said first capacitor is equal to that of said second capacitor, and the value of said first resistor is equal to that of said second resistor.

4. Apparatus as in claim 3 including a first diode having the anode thereof connected to the junction of said second voltage source and said first inductor, a second diode having the cathode thereof connected to the junction of said second inductor and said second capacitor, and a pair of resistors of equal magnitude connected between the cathode of said first diode and the anode of said second diode, the output signal being derived from the junction of said pair of resistors.

5. Apparatus as in claim 4 including a capacitor connecting the cathode of said first diode and a capacitor connecting the anode of said second diode to a common reference point.

References Cited in the file of this patent

UNITED STATES PATENTS

| Number | Name | Date |
|---|---|---|
| 1,586,533 | Paterson | June 1, 1926 |
| 2,059,594 | Massa | Nov. 3, 1936 |
| 2,341,240 | Reid | Feb. 8, 1944 |
| 2,351,193 | Crosby | June 13, 1944 |
| 2,383,855 | Hansell | Aug. 28, 1945 |
| 2,410,122 | Mercer | Oct. 29, 1946 |
| 2,413,913 | Duke | Jan. 7, 1947 |
| 2,422,083 | Crosby | June 10, 1947 |
| 2,457,013 | Usselman | Dec. 21, 1948 |
| 2,523,401 | Thompson | Sept. 26, 1950 |